US007410020B2

(12) United States Patent
Kikuchi et al.

(10) Patent No.: US 7,410,020 B2
(45) Date of Patent: Aug. 12, 2008

(54) INTERLOCK DEVICE FOR HIGH-VOLTAGE APPARATUS

(75) Inventors: Takaji Kikuchi, Toyota (JP); Hiroshi Kamei, Nagoya (JP); Masakatsu Shintomi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 520 days.

(21) Appl. No.: 11/137,326

(22) Filed: May 26, 2005

(65) Prior Publication Data

US 2005/0266740 A1 Dec. 1, 2005

(30) Foreign Application Priority Data

May 28, 2004 (JP) ............................. 2004-159762
Feb. 9, 2005 (JP) ............................. 2005-032930

(51) Int. Cl.
*B60R 16/04* (2006.01)

(52) U.S. Cl. ................... 180/68.5; 200/50.01; 200/50.1

(58) Field of Classification Search ................ 180/68.5; 200/50.01, 50.14, 50.28, 50.02
See application file for complete search history.

(56) References Cited

U.S. PATENT DOCUMENTS 4,572,878 A * 2/1986 Daugherty ................... 429/62
4,912,747 A * 3/1990 Sakama et al. .............. 361/600
5,252,260 A * 10/1993 Schuman ..................... 261/26
5,289,347 A * 2/1994 McCarthy et al. ........... 361/809
5,853,058 A * 12/1998 Endo et al. ................. 180/65.1
5,942,737 A 8/1999 Waters et al.
6,301,126 B1 * 10/2001 Smith ......................... 361/826

OTHER PUBLICATIONS

Kitami et al., "Interlock Switch of Power Control Unit," Toyota Technical Review, 14136, pp. 39-40, Jan. 31, 2003 with partial translation.

* cited by examiner

*Primary Examiner*—Christopher Ellis
*Assistant Examiner*—John D Walters
(74) *Attorney, Agent, or Firm*—Oliff & Berridge, PLC

(57) ABSTRACT

An interlock device includes an upper lid provided such that an inverter unit cannot be exposed and having a shape accommodating a housing, an interlock detecting terminal electrically connected to the housing when being in contact therewith and electrically disconnected from the housing when losing contact therewith, a bolt for fixing the upper lid to the housing, and a bracket for restricting a motion of the bolt for removal of the upper lid when the interlock detecting terminal is in contact with the housing.

10 Claims, 4 Drawing Sheets

VIEW IN DIRECTION OF ARROW A

VIEW IN DIRECTION OF ARROW A

INTERLOCK DEVICE FOR HIGH-VOLTAGE APPARATUS

This nonprovisional application is based on Japanese Patent Applications Nos. 2004-159762 and 2005-032930 filed with the Japan Patent Office on May 28, 2004 and Feb. 9, 2005, respectively, the entire contents of which are hereby incorporated by reference.

BACKGROUND OF THE INVENTION

1. Field of the Invention

The present invention relates to an interlock device for a high-voltage apparatus, and particularly relates to an interlock device that enables a high-voltage apparatus to be interrupted mechanically and electrically for maintenance and inspection.

2. Description of the Background Art

A hybrid vehicle and an electric vehicle are configured such that a breaker device and a high-voltage apparatus are placed in a space separated from a passenger compartment and a luggage compartment, and covered with a maintenance lid to be contained in an enclosed space. In performing maintenance and inspection on the high-voltage apparatus, sufficient safety measures are indispensable to ensure safety against the high voltage thereof. For example, there is provided a technique for providing an interlock switch in the high-voltage apparatus described below.

TOYOTA Technical Review (Publication No. 14136) discloses an interlock switch of a power control unit (PCU) having a simplified mounting structure and wiring. The interlock switch is formed of a PCU case, a waterproof grommet, a wire harness, an interlock electrode, a PCU cover, and a bolt.

For the interlock switch of the PCU disclosed in the above-described document, the interlock switch is formed of the interlock electrode, the PCU cover, and the PCU case. As such, the interlock switch has a simplified mounting structure and wiring, compared with a connector-type interlock switch attached to the PCU cover via a bracket, which results in the reduced cost thereof and the reduced number of assembling steps therefor.

As shown in FIG. 1, for example, an interlock switch 902 to be provided at a high-voltage apparatus is conventionally placed at a housing 906. Interlock switch 902 is kept turned on when an upper cover 900 is attached, while interlock switch 902 is turned off when upper cover 900 is removed. When interlock switch 902 is turned off, power supply to an inverter provided within housing 906 is interrupted. Therefore, when a worker aims to remove upper lid 900, power supply to the inverter is not interrupted until upper cover 900 is lifted up. In order that a worker can perform maintenance and inspection in a safer manner, the interlock is required to be activated earlier than the time when upper cover 900 is lifted up.

In the interlock switch disclosed in the above-described document, electrical conduction among the PCU cover, the PCU case, and the interlock electrode is also interrupted when the PCU cover is removed. Therefore, this interlock switch has a similar problem described above.

Furthermore, since interlock switch 902 is required to be provided within housing 906, it is necessary to route a signal line 908 into housing 906. As a result, the interlock switch disadvantageously has a complicated structure, which increases manufacturing cost.

SUMMARY OF THE INVENTION

An object of the present invention is to provide an interlock device that assures safety in an earlier stage of maintenance and inspection of a high-voltage apparatus.

An interlock device according to the present invention is provided at an electrically-conductive housing for containing a high-voltage apparatus. The interlock device includes an upper lid provided such that the high-voltage apparatus cannot be exposed and having a shape accommodating the housing, a terminal electrically connected to the housing when being in contact therewith and electrically disconnected from the housing when losing contact therewith, a fixing member for fixing the upper lid to the housing, and a restricting member for restricting a motion of the fixing member for removal of the upper lid when the terminal is in contact with the housing.

According to the present invention, the interlock device includes the upper lid provided such that the high-voltage apparatus (e.g. an inverter) cannot be exposed and having a shape accommodating the housing, the terminal which is electrically connected to the housing when being in contact therewith and which is electrically disconnected from the housing when losing contact therewith, the fixing member for fixing the upper lid to the housing (e.g. an upper-lid-fastening bolt), and the restricting member for restricting a motion of the upper-lid-fastening bolt for removal of the upper lid (e.g. a motion in loosening) when the terminal is in contact with the housing. Therefore, when the upper-lid-fastening bolt is to be loosened to remove the upper lid, it is necessary to remove the restricting member. When the restricting member is to be removed, it is necessary to remove the terminal from the housing to break contact therebetween, in other words, to electrically disconnect the terminal from the housing. Accordingly, it is possible to ensure that the upper-lid-fastening bolt cannot be loosened until the terminal is removed from the housing. Since power supply to the inverter is interrupted in response to the sensing of the terminal being removed from the housing to be electrically disconnected therefrom, it is possible to activate the interlock before the upper lid is lifted up. Therefore, there can be provided an interlock device that assures safety in an earlier stage of maintenance and inspection of a high-voltage apparatus. Furthermore, the terminal is provided outside the housing, which eliminates the need to route a signal line thereinto. Accordingly, cost increase can be suppressed.

Preferably, the interlock device further includes a fastening portion for fastening the terminal and the restricting member to the housing.

According to the present invention, the interlock device includes the fastening portion for fastening the terminal and the restricting member to the housing (e.g. a terminal-fixing bolt). Therefore, the terminal and the restricting member can be removed from the housing by loosening the terminal-fixing bolt. In other words, the upper-lid-fastening bolt cannot be loosened until the fastening portion is loosened to remove the terminal from the housing, resulting that power supply to the inverter can be interrupted before the upper lid is lifted up.

More preferably, the fastening portion is a bolt, and the terminal is a nut accommodating the bolt. For the nut, a portion except for a portion to be screwed against the bolt is electrically insulated.

According to the present invention, the terminal is a nut accommodating the bolt. For the nut, a portion except for a portion to be screwed against the bolt is electrically insulated. Therefore, when the bolt is loosened to remove the terminal from the housing, the terminal can be prevented from being in contact with an electrically-conductive part in an engine room and from being electrically connected therewith. Accordingly, this can assuredly interrupt power supply to the inverter.

More preferably, the nut is covered with an insulator.

According to the present invention, the terminal is covered with an insulator (e.g. a resin). Therefore, when the bolt is loosened to remove the terminal from the housing, the terminal can be prevented from being in contact with an electrically-conductive part in the engine room and from being electrically connected therewith. Accordingly, this can assuredly interrupt power supply to the inverter.

More preferably, in the interlock device, the fixing member is a member to be screwed for fixing the upper lid to the housing by screwing. The restricting member includes a restricting portion for making the member to be screwed unrotatable.

According to the present invention, the fixing member is a member to be screwed for fixing the upper lid to the housing by screwing (e.g. an upper-lid-fastening bolt). The restricting member includes a restricting portion for making the upper-lid-fastening bolt unrotatable. Therefore, the restricting member can prevent the upper-lid-fastening bolt from loosening. In order to remove the restricting member, it is necessary to remove the terminal from the housing. Therefore, power supply to the inverter can be interrupted before the upper lid is lifted up.

More preferably, the fixing member is a bolt. The restricting portion includes a member formed to surround a bolt head of the bolt.

According to the present invention, the restricting portion surrounds a bolt head of the bolt, which makes the bolt unrotatable. Therefore, the bolt cannot be loosened until the restricting member is removed from the housing. In order to remove the restricting member, it is necessary to remove the terminal from the housing. Therefore, power supply to the inverter can be interrupted before the upper lid is lifted up.

More preferably, the interlock device further includes a control portion for controlling an operation of the high-voltage apparatus. The control portion ceases allowing power to be supplied to the high-voltage apparatus when the terminal and the housing are disconnected.

According to the present invention, the control portion ceases allowing power to be supplied to the high-voltage apparatus when the terminal and the housing are disconnected. Therefore, when a worker removes the terminal from the housing, the terminal and the housing are in an electrically-disconnected state. When the control portion senses the state above, it ceases allowing power to be supplied to the inverter unit. Since the upper-lid-fastening bolt cannot be loosened until the terminal is removed, power supply to the inverter can be interrupted before the upper-lid-fastening bolt is loosened to remove the upper lid. Accordingly, safety can be assured in an earlier stage of maintenance and inspection of a high-voltage apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
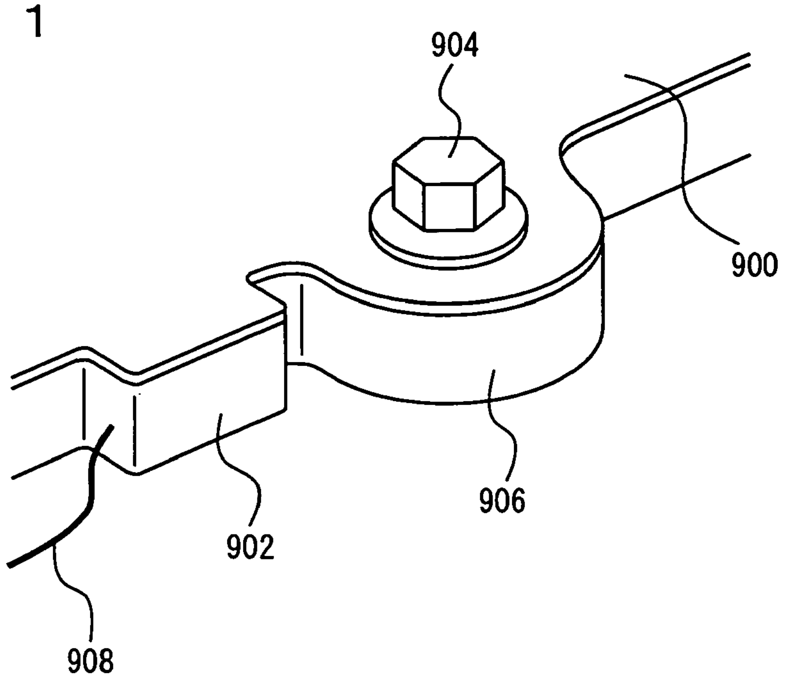
FIG. 1 is an external view of a conventional interlock device.

An interlock device according to the embodiments of the present invention will now be described in reference to the drawings. In the following description, the same parts are denoted by the same reference characters, and have the same names and functions. Therefore, the detailed description thereof will not be repeated.

First Embodiment

There will now be described an inverter unit where a housing contains an inverter circuit, according to the present invention. The inverter circuit converts direct-current power supplied from a secondary battery mounted on a vehicle into three-phase, alternating-current power, and provides the same to a motor generator serving as a three-phase rotating electrical machine. In the present invention, the high-voltage apparatus is not limited to the inverter circuit. Although the inverter unit is described in the present embodiment in reference to the case where it is mounted on a hybrid vehicle, the present invention is not limited thereto, and can widely be applied to vehicles in general including an electric vehicle and a fuel-cell vehicle. In the following description, a general user such as a vehicle driver or a fellow passenger, and a mechanic in a maintenance facility are collectively referred to as a worker.

A vehicle on which the inverter unit according to the present embodiment is mounted is a hybrid vehicle having an engine and a motor mounted thereon. Drive motors are mounted on a front side and a rear side, respectively, and driven by power supplied from the secondary battery. In the present invention, the secondary battery is not the only option, and a capacitor, for example, may be used.

Figure 2:
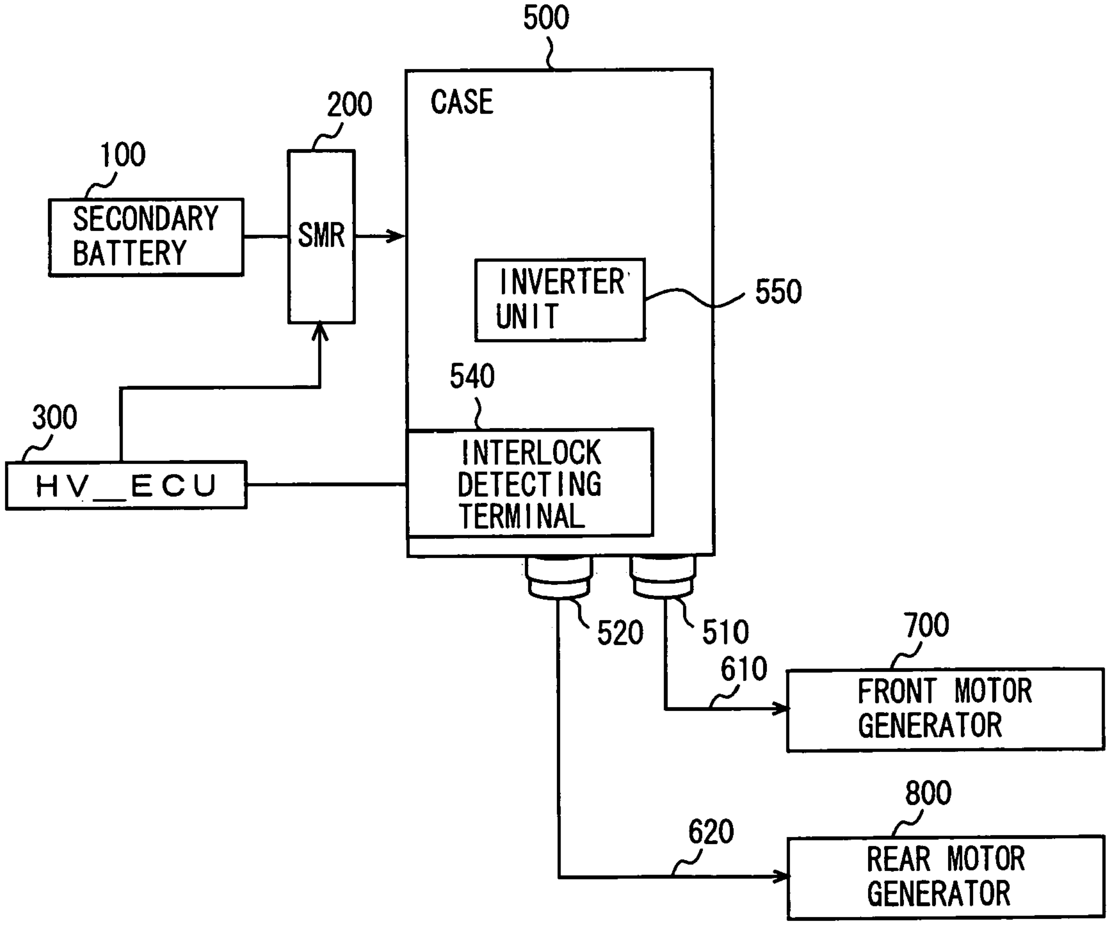
FIG. 2 is a view showing a power train of a vehicle on which an inverter unit according to a first embodiment is mounted.

Referring to a block diagram in FIG. 2, the vehicle includes a secondary battery 100 such as a nickel metal hydride battery, a front motor generator 700 and a rear motor generator 800 both serving as motor generators for traveling, an inverter unit 550 for supplying power to motor generators 700 and 800, a system main relay 200 provided between secondary battery 100 and inverter unit 550, a hybrid vehicle (HV)_ electronic control unit (ECU) 300 for controlling system main relay 200, and an electrically-conductive housing 500 for containing inverter unit 550. HV_ECU 300 is electrically connected to an interlock detecting terminal 540.

Front motor generator 700 is connected to a front-wheel drive axle of the vehicle to drive a front wheel with power supplied from secondary battery 100 via inverter unit 550, or to be driven by the front wheel to generate power in a regenerative manner. Rear motor generator 800 is connected to a rear-wheel drive axle of the vehicle to drive a rear wheel with power supplied from secondary battery 100 via inverter unit 550, or to be driven by the rear wheel to generate power in a regenerative manner. The generated power above is used to charge secondary battery 100.

System main relay 200 interrupts power supply from secondary battery 100 to inverter unit 550 based on a control signal from HV_ECU 300.

A PCU may be used in place of inverter unit 550 according to the present embodiment. The PCU contains a high-voltage apparatus such as an inverter or a converter.

Secondary battery 100, inverter unit 550, front motor generator 700, and rear motor generator 800 are connected by means of a three-phase power cable. Inverter unit 550 and front motor generator 700 are connected by means of a three-phase power cable 610 via a connector 510 of inverter unit 550, while inverter unit 550 and rear motor generator 800 are connected by means of a three-phase power cable 620 via a connector 520 of inverter unit 550.

As such, three-phase power cables 610 and 620 to be connected to inverter unit 550 are connected thereto by means of connectors 510 and 520.

HV_ECU 300 senses whether interlock detecting terminal 540 and housing 500 are in an electrically-connected or -disconnected state, and controls an operation of inverter unit 550 depending on each state. Particularly, if HV_ECU 300 determines that interlock detecting terminal 540 and housing 500 are in an electrically-connected state, HV_ECU 300 controls system main relay 200 such that it allows system main relay 200 to supply power to inverter unit 550. If HV_ECU 300 determines that interlock detecting terminal 540 and housing 500 are in an electrically disconnected state, HV_ECU 300 controls system main relay 200 such that it ceases allowing system main relay 200 to supply power to inverter unit 550.

Figure 3:
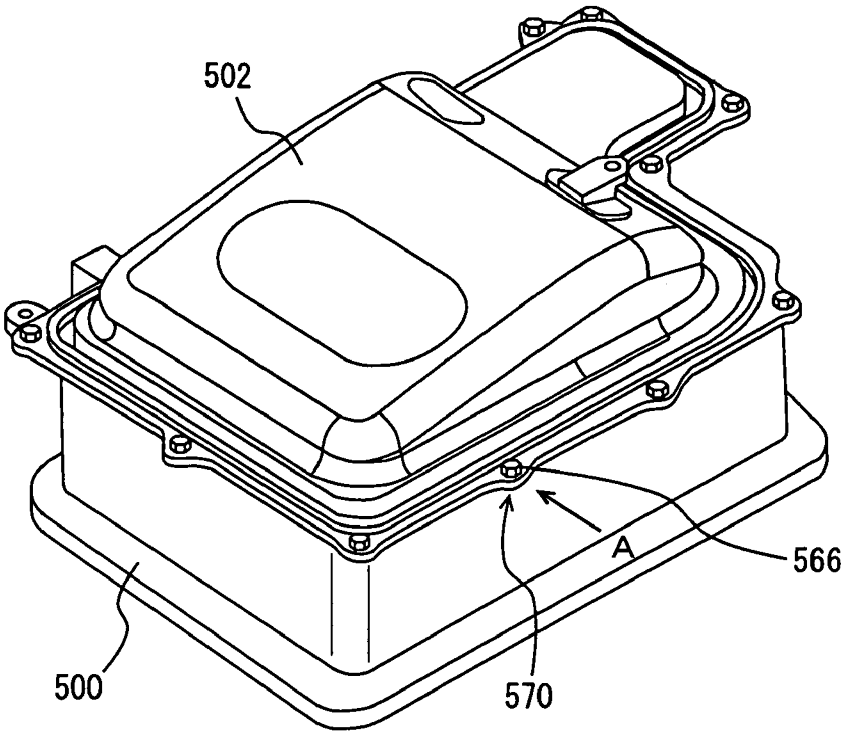
FIG. 3 is an external view of an inverter unit.

As shown in FIG. 3, an upper lid 502 is fastened to housing 500 by means of a plurality of bolts 566 at a plurality of sites. Upper lid 502 has a shape accommodating the shape of housing 500. When upper lid 502 is fixed to housing 500, inverter unit 550 cannot be exposed. Housing 500 is provided with an interlock device 570 in order that a worker can perform, for example, maintenance and inspection on inverter unit 550 in a safer manner.

Figure 4:
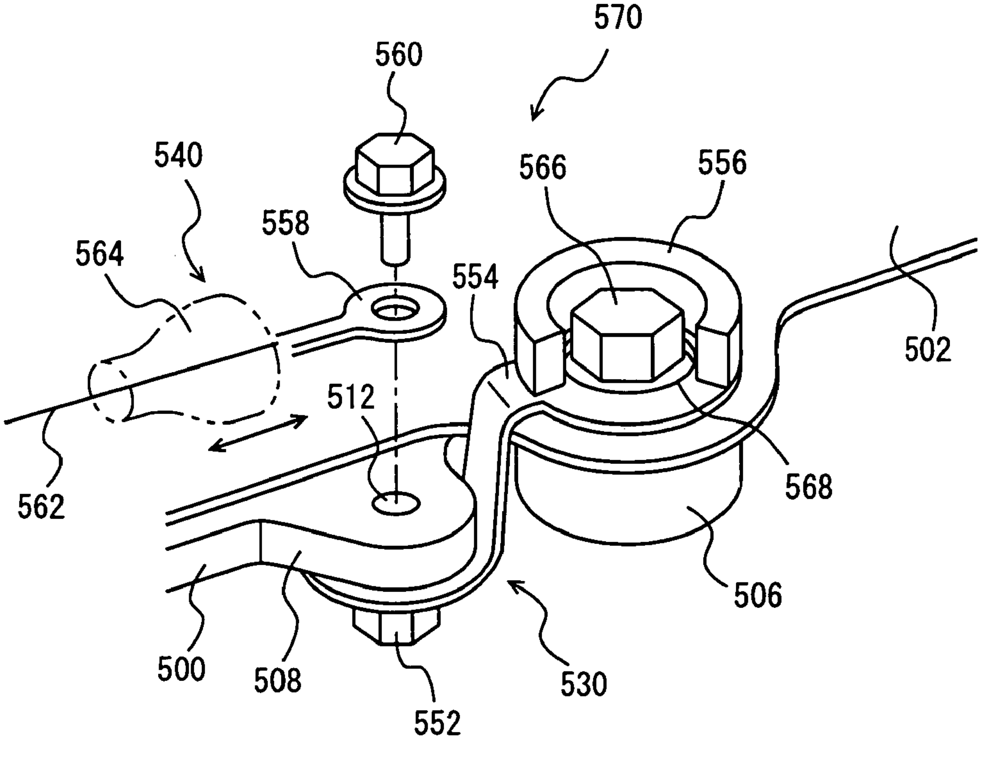
FIG. 4 is a perspective view of an interlock device according to the first embodiment.

Referring to FIG. 4, interlock device 570 according to the present embodiment, which is seen in the direction of an arrow A in FIG. 3, is composed of an interlock terminal 540, a bracket 530, and a bolt 560.

Interlock terminal 540 has a disk-shaped, round terminal 558, to which a signal line 562 is connected. Round terminal 558 has an opening in a central portion. Signal line 562 is provided with an insulating cover 564 movable along a lead thereof. The shape of insulating cover 564 is not limited to the particular shape as long as it can cover round terminal 558.

Housing 500 is provided with a mounting portion 508 for mounting interlock 540. Mounting portion 508 is provided with a through hole 512. Bolt 560 is inserted through the opening of round terminal 558 into through hole 512.

Bracket 530 is composed of a nut 552, a protector 556, a metal plate 554 formed to have a predetermined shape. One end of metal plate 554 is provided with nut 552, which is provided to rest underneath mounting portion 508. In other words, bolt 560 penetrates mounting portion 508 to be fastened to nut 552. By fastening bolt 560, interlock detecting terminal 540 is fixed to housing 500.

At the other end of metal plate 554 is formed an opening 568 having a shape accommodating the shape of a bolt head of bolt 566. The shape of opening 568 is not limited to the particular shape as long as it allows the bolt head of bolt 566 to penetrate therethrough. In the present embodiment, for example, opening 568 has a round shape with a diameter larger than that of the bolt head. Along opening 568 of metal plate 554 is formed protector 556 to substantially surround the bolt head of bolt 566. The shape of protector 556 is not limited to the particular shape as long as it prevents a tool from being attached to bolt 566. In the present embodiment, protector 556 has a shape to substantially surround the bolt head. As an alternative, protector 556 may have a shape to entirely surround the bolt head. Particularly in the case where a hexagon socket head cap screw is used, such an alternative is preferable.

Figure 5:
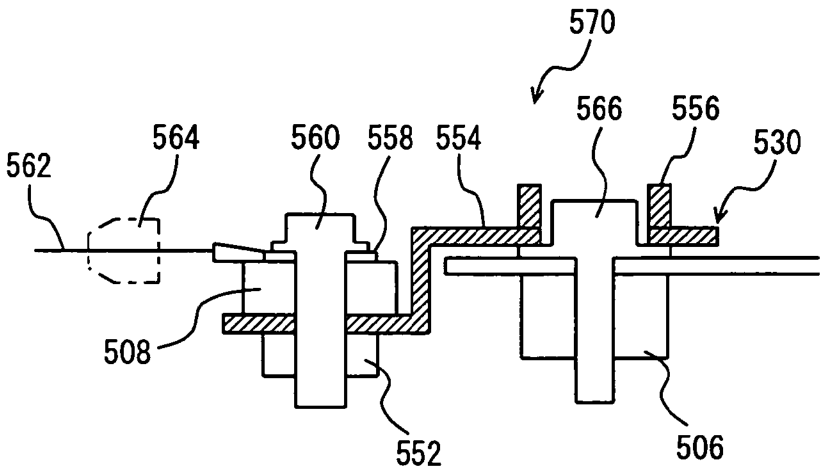
FIG. 5 is a cross section of the interlock device according to the first embodiment.

Referring to FIG. 5, bracket 530 is provided by fastening bolt 566 to a mounting portion 506 to fix upper lid 502 to housing 500, and then placing the bolt head of bolt 566 through opening 568. Nut 552 provided at the other end of bracket 530 is fastened to bolt 560, with round terminal 558 and mounting portion 508 interposed therebetween.

When a worker aims to remove upper lid 502, bolt 560 is initially removed to detach interlock detecting terminal 540, and then bracket 530 is removed from housing 500. Thereafter, bolt 566 is loosened away to remove upper lid 502. In other words, bolt 566 cannot be removed until interlock detecting terminal 540 is removed.

When interlock detecting terminal 540 is removed from housing 500, it is in an electrically disconnected state with respect to the housing 500. When HV_ECU 300 senses such a state of interlock detecting terminal 540, HV_ECU 300 controls system main relay 200 such that it ceases allowing system main relay 200 to supply power to inverter unit 550.

Figure 6:
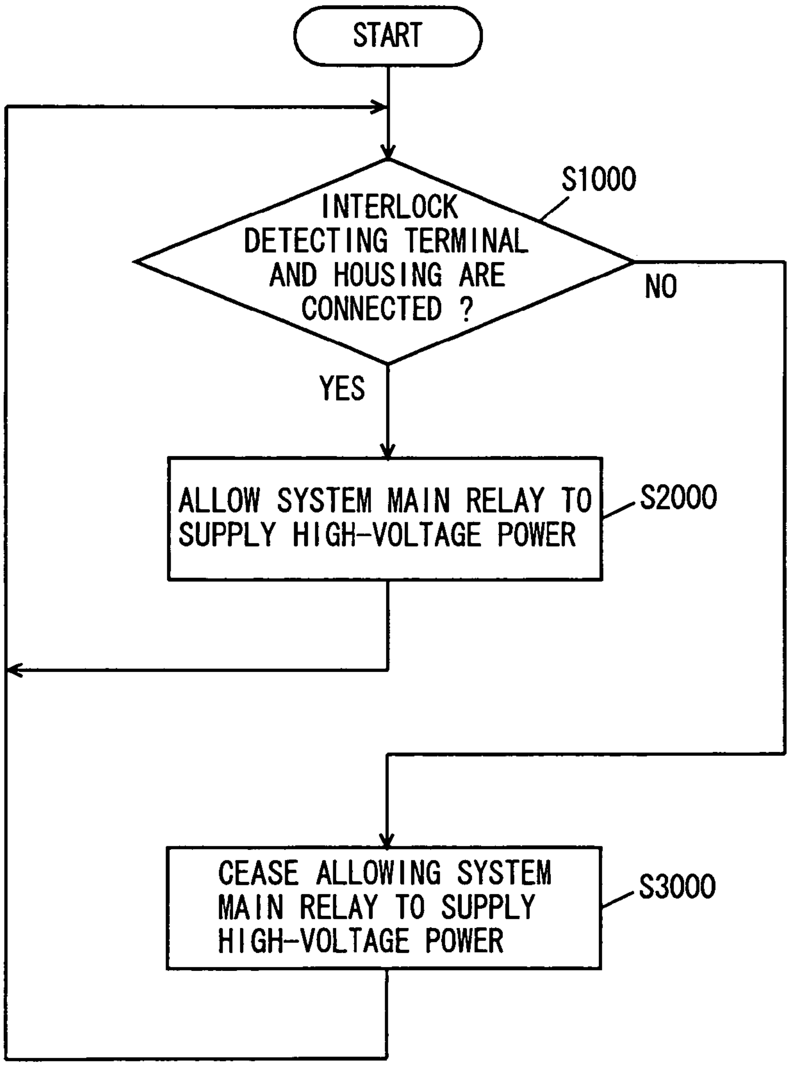
FIG. 6 is a flowchart showing a control structure of a program executed in an HV_ECU.

Referring to FIG. 6, a control structure of a program executed in HV_ECU 300 shown in FIG. 2 is described.

In step (hereinafter abbreviated as S) 1000, HV_ECU 300 determines whether or not interlock detecting terminal 540 and housing 500 are connected. In the present embodiment, such a determination is made, for example, by sensing a change in current through interlock detecting terminal 540. Particularly, HV_ECU 300 applies a predetermined voltage to interlock detecting terminal 540. Since housing 500 is grounded at that time, current flows in response to interlock detecting terminal 540 and housing 500 being connected to each other, which enables HV_ECU 300 to make such a determination based on a change in current through interlock detecting terminal 540. However, the manner of making a determination is not limited thereto.

If HV_ECU 300 determines that interlock detecting terminal 540 and housing 500 are connected (YES in S1000), the process proceeds to S2000. If not (NO in S1000), the process proceeds to S3000.

In S2000, HV_ECU 300 allows system main relay 200 to supply high-voltage power. Thereafter, the process returns to S1000.

In S3000, HV_ECU 300 ceases allowing system main relay 200 to supply high-voltage power. Thereafter, the process returns to S1000.

An operation of the interlock device and HV_ECU 300 according to the present embodiment will now be described based on the structure and flowchart above.

When round terminal 558 is fastened to mounting portion 508 by means of bolt 560, interlock detecting terminal 540 and housing 500 are electrically connected (YES in S1000), which allows system main relay 200 to supply high-voltage power (S2000).

When bolt 560 is removed and round terminal 558 is removed from housing 500, interlock detecting terminal 540 and housing 500 are electrically disconnected. After round terminal 558 is removed from housing 500, round terminal 558 is preferably provided with insulating cover 564. By doing so, round terminal 558 is prevented from being in contact with an electrically-conductive part in the engine room and from being electrically connected to the same. In other words, power supply to inverter unit 550 can be avoided.

When HV_ECU 300 determines that interlock detecting terminal 540 and housing 500 are disconnected (NO in S1000), it ceases allowing system main relay 200 to supply high-voltage power (S3000). At that time, even if HV_ECU 300 senses a request to operate inverter unit 550, it does not send to the system main relay a control signal that instructs the same to supply power. Therefore, a worker performs maintenance and inspection on inverter unit 550 under the condition where high-voltage power supply thereto is not allowed.

As described above, according to the interlock device according to the present embodiment, when the upper-lid-fastening bolt is to be loosened to remove the upper lid, it is necessary to remove the bracket. When the bracket is to be removed, it is necessary to remove the terminal from the housing such that the terminal and the housing lose contact with each other, namely, are electrically disconnected. Therefore, the present invention can assure that the upper-lid-fastening bolt cannot be loosened until the terminal is removed from the housing. In response to the sensing of the terminal being removed and of the terminal and the housing being electrically disconnected, power supply to the inverter is interrupted, which results in that the interlock can be activated before the upper lid is lifted up. Consequently, there can be provided an interlock device which can assure safety in an earlier stage of maintenance and inspection of a high-voltage apparatus. Furthermore, the terminal is provided outside the housing, which eliminates the need to route the signal line thereinto. Accordingly, cost increase can be suppressed.

Second Embodiment

An interlock device according to a second embodiment is described below. The interlock device according to the present embodiment has the same components as interlock device 570 according to the first embodiment described above, except that it includes an interlock detecting terminal 580 in place of interlock detecting terminal 540 and that bracket 530 does not have nut 552. The same components are denoted by the same reference characters and have the same functions. Therefore, the detailed description thereof will not be repeated here.

Figure 7:
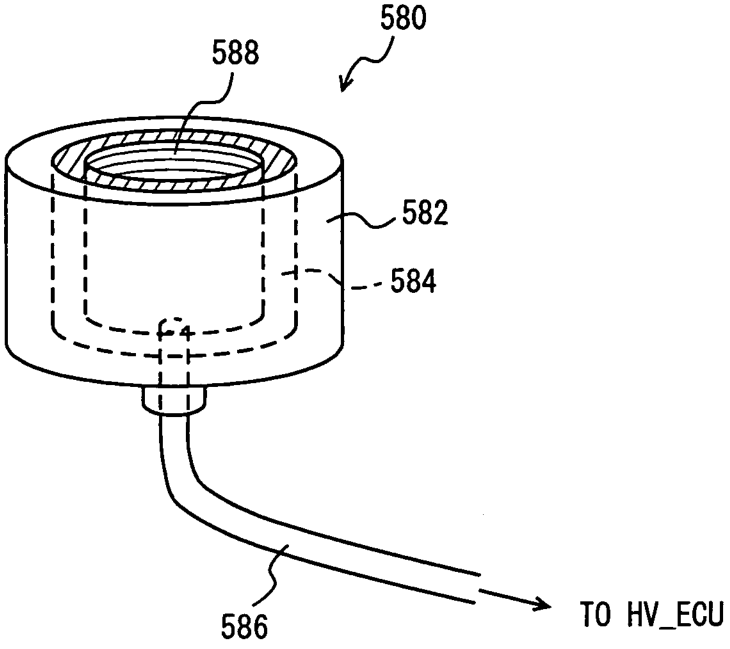
FIG. 7 is an external view of an interlock detecting terminal according to a second embodiment.

As shown in FIG. 7, interlock detecting terminal 580 is composed of a nut 584 provided with a portion to be screwed to accommodate bolt 560, and a harness 586 connected to nut 584. A portion of nut 584 except for the portion to be screwed against bolt 560 is electrically insulated, and covered, for example, with an insulator 582 formed of resin or the like in the present embodiment. Insulator 582 is not limited to resin, and may be formed of rubber. Nut 584 is not particularly limited to an electric conductor, and is formed of metal such as iron, copper, or aluminum. Signal line 586 to be connected to nut 584 is connected to HV_ECU 300.

Figure 8:
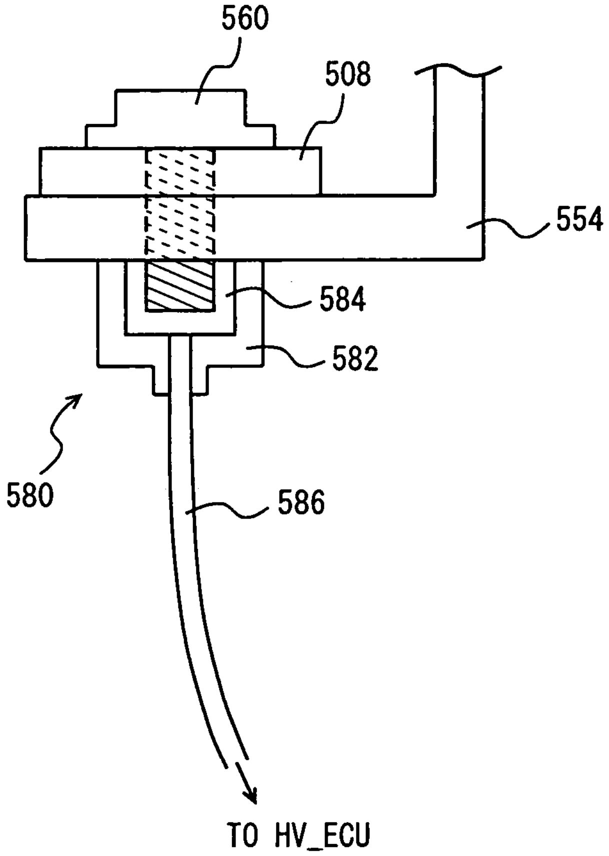
FIG. 8 is a cross section of an interlock device according to the second embodiment.

As shown in FIG. 8, interlock detecting terminal 580 is provided such that it rests underneath mounting portion 508 provided at housing 500. Bolt 560 penetrates openings formed in mounting portion 508 and metal plate 554 of bracket 530, respectively, to be fastened to a portion to be screwed 588 of interlock detecting terminal 580, which is fixed to housing 500 by fastening bolt 560.

An action of interlock device 570 according to the present embodiment and based on the structure described above is now described.

When a worker aims to remove upper lid 502, bolt 560 is initially removed to detach interlock detecting terminal 580, and then bracket 530 is removed from housing 500. Thereafter, a worker loosens bolt 566 away to remove upper lid 502. In other words, bolt 566 cannot be removed until interlock detecting terminal 580 is removed.

When interlock detecting terminal 580 is removed from housing 500, it is in an electrically disconnected state with respect to housing 500. When HV_ECU 300 senses such a state of interlock detecting terminal 580, it ceases allowing power to be supplied to inverter unit 550. At that time, even if HV_ECU 300 senses a request to operate inverter unit 550, it does not send to the system main relay a control signal that instructs the same to supply power. Therefore, a worker performs maintenance and inspection on inverter unit 550 under the condition where high-voltage power supply thereto is not allowed.

As described above, the interlock device according to the present embodiment has an advantage, in addition to that of the interlock device according to the first embodiment, in that when the bolt is loosened to remove the terminal from the housing, the terminal covered with resin is prevented from being in contact with an electrically-conductive part in the engine room and from being electrically connected therewith. Therefore, the present invention can assuredly interrupt power supply to the inverter.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An interlock device provided at an electrically-conductive housing for containing a high-voltage apparatus, comprising:

an upper lid provided such that said high-voltage apparatus cannot be exposed and having a shape accommodating said housing;

a terminal electrically connected to said housing when being in contact therewith and electrically disconnected from said housing when losing contact therewith;

a fixing member for fixing said upper lid to said housing; and a restricting member for restricting a motion of said fixing member for removal of said upper lid when said terminal is in contact with said housing, wherein the restricting member is structured such that the terminal must be electrically disconnected from the housing before the restricting member is removed.

2. The interlock device according to claim 1, further comprising a fastening portion for fastening said terminal and said restricting member to said housing.

3. The interlock device according to claim 2, wherein said fastening portion is a bolt, said terminal is a nut accommodating said bolt, and a portion of said nut except for a portion to be screwed against said bolt is electrically insulated.

4. The interlock device according to claim 3, wherein said nut is covered with an insulator.

5. The interlock device according to claim 2, wherein said fixing member is a member to be screwed for fixing said upper lid to said housing by screwing, and said restricting member includes a restricting portion for making said member to be screwed unrotatable.

6. The interlock device according to claim 5, wherein said fixing member is a bolt, and said restricting portion includes a member formed to surround a bolt head of said bolt.

7. The interlock device according to claim 1, wherein said fixing member is a member to be screwed for fixing said upper lid to said housing by screwing, and said restricting member includes a restricting portion for making said member to be screwed unrotatable.

8. The interlock device according to claim 7, wherein said fixing member is a bolt, and said restricting portion includes a member formed to surround a bolt head of said bolt.

9. The interlock device according to claim 1, further comprising a control portion for controlling an operation of said high-voltage apparatus, wherein said control portion ceases allowing power to be supplied to said high-voltage apparatus when said terminal and said housing are disconnected.

10. The interlock device according to claim 1, further comprising control means for controlling an operation of said high-voltage apparatus, wherein said control means includes means for ceasing allowing power to be supplied to said high-voltage apparatus when said terminal and said housing are disconnected.

* * * * *